Nov. 6, 1934.  G. H. LELAND  1,979,479
TOOL CONTROLLING DEVICE
Filed Nov. 14, 1932  4 Sheets-Sheet 1
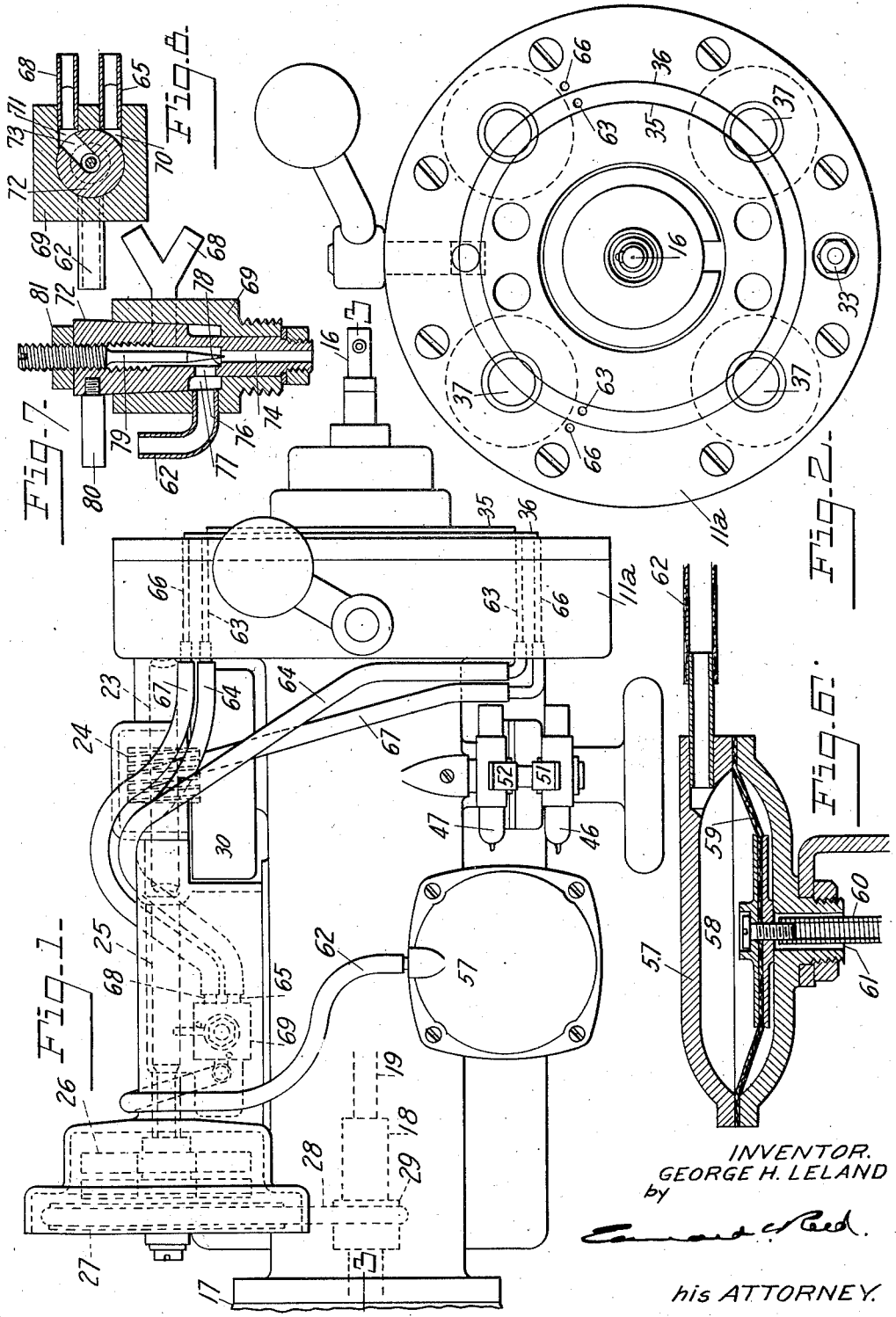
INVENTOR.
GEORGE H. LELAND
by
his ATTORNEY.

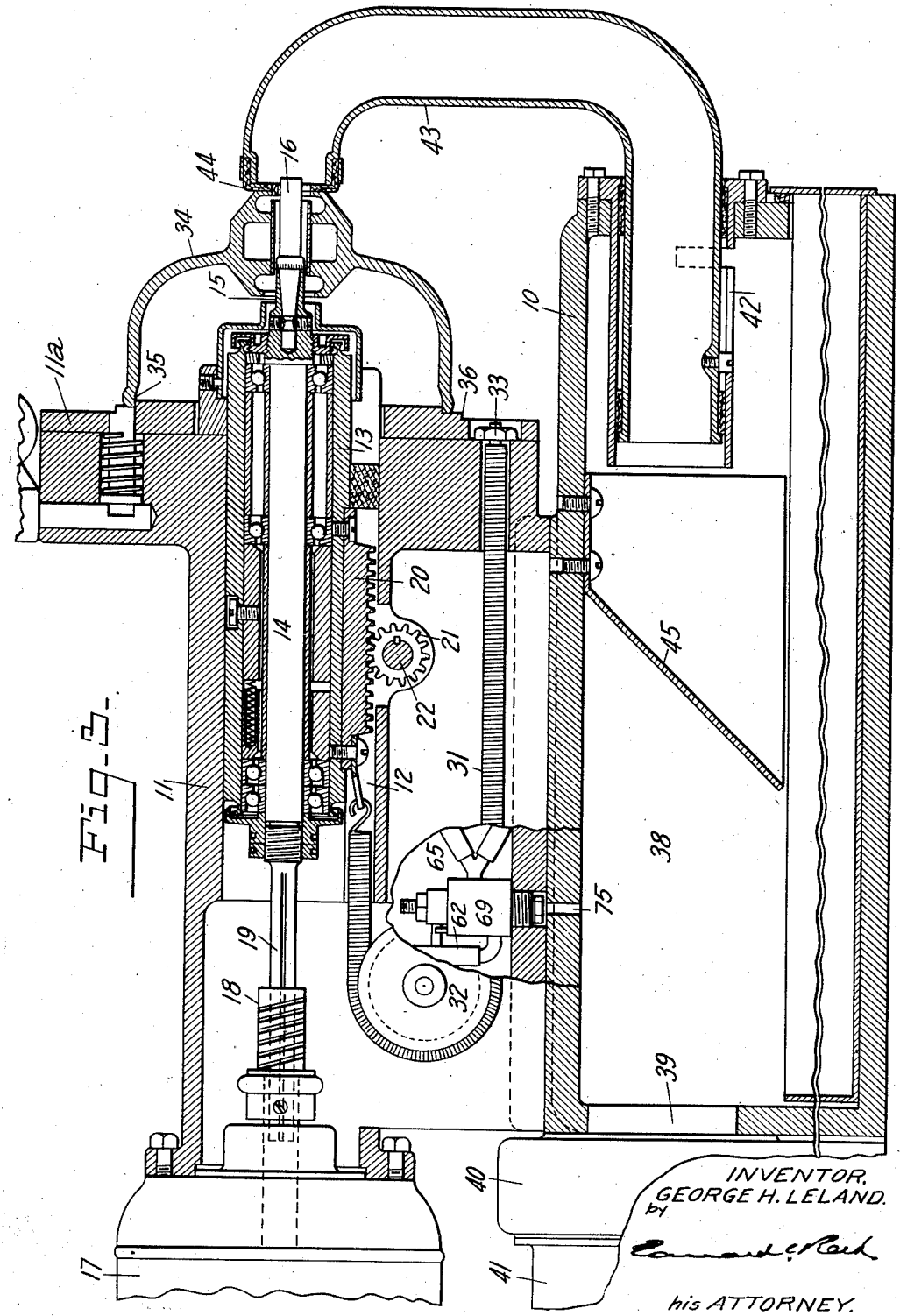

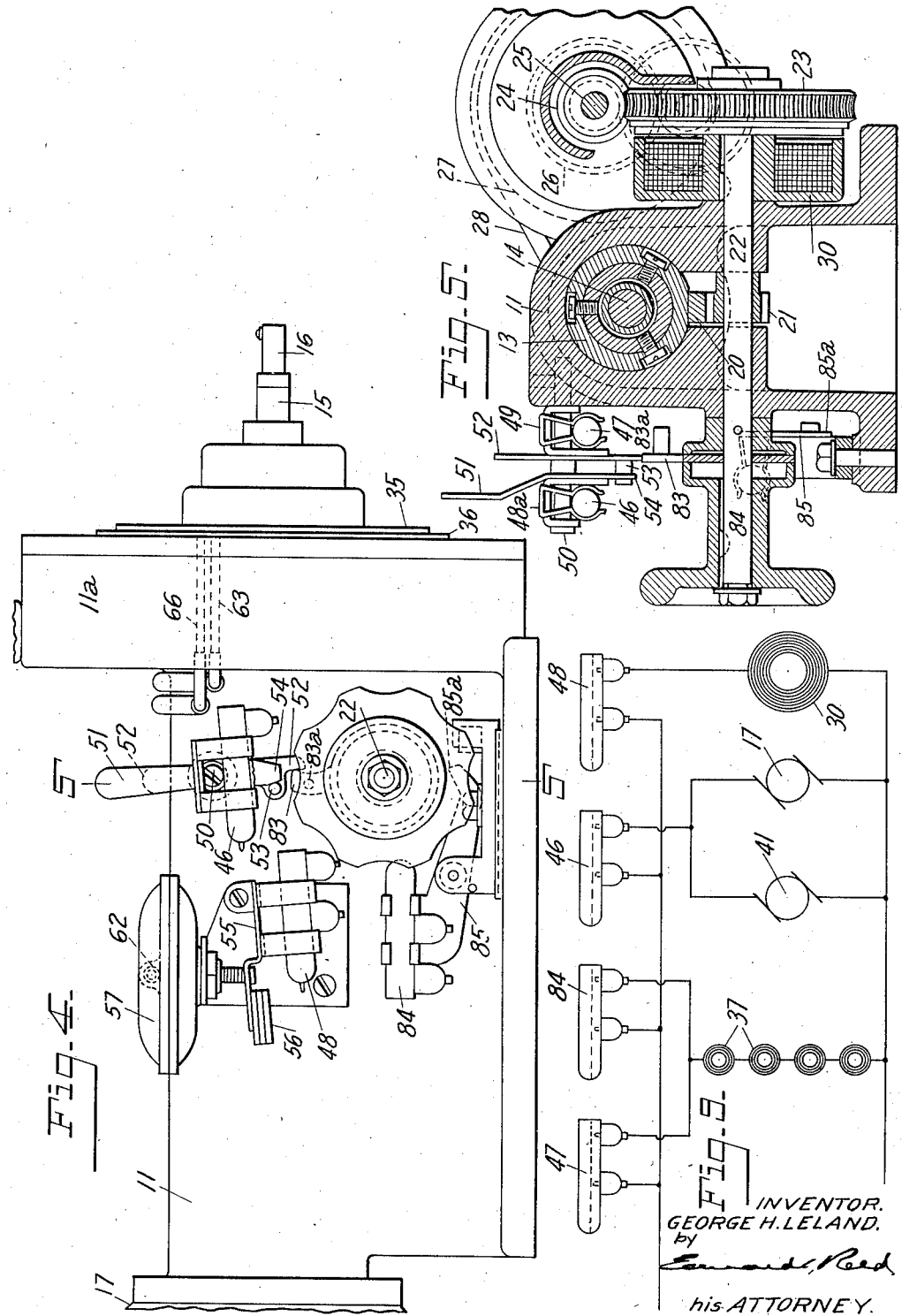

Nov. 6, 1934.  G. H. LELAND  1,979,479
TOOL CONTROLLING DEVICE
Filed Nov. 14, 1932   4 Sheets-Sheet 4
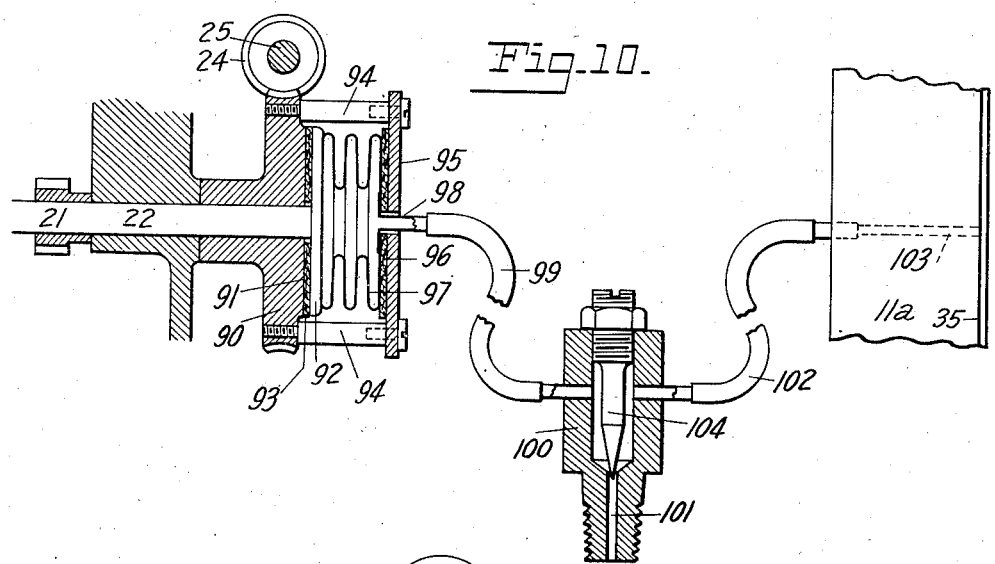
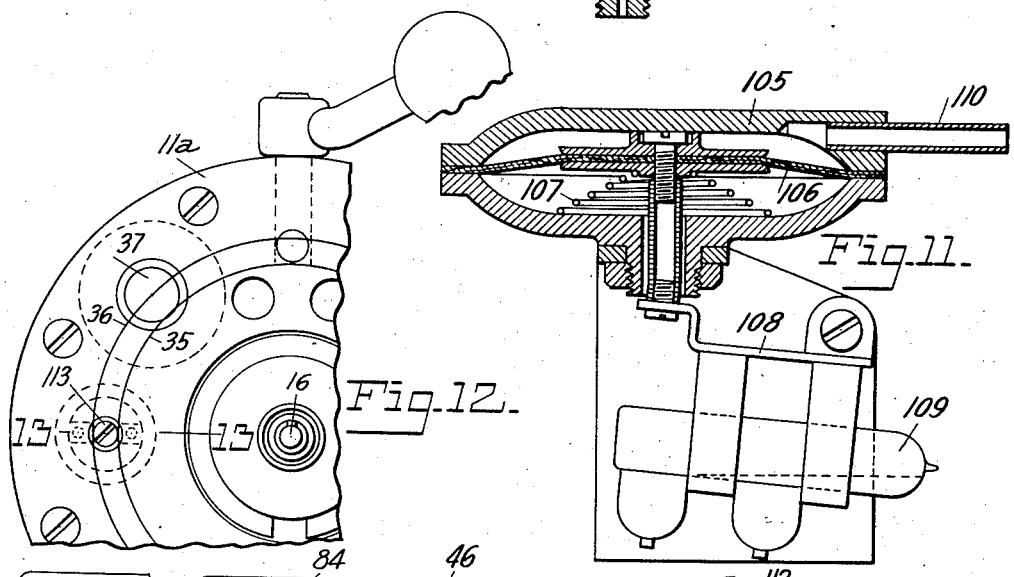
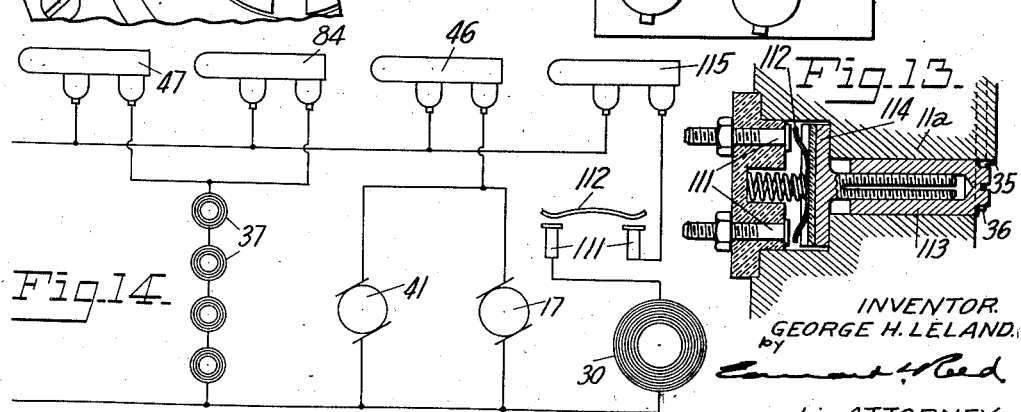
INVENTOR.
GEORGE H. LELAND.
by
his ATTORNEY.

Patented Nov. 6, 1934

1,979,479

UNITED STATES PATENT OFFICE 1,979,479

TOOL CONTROLLING DEVICE

George H. Leland, Dayton, Ohio, assignor of one-half to The Leland Electric Company, Dayton, Ohio, a corporation of Ohio Application November 14, 1932, Serial No. 642,545

35 Claims. (Cl. 77—32)

This invention relates to a tool controlling device and is designed primarily for use in the boring machine shown and described in my copending application for patent filed July 11, 1932, Serial No. 621,941.

One object of the invention is to provide an improved device for controlling the operation of a cutting tool by the work which is to be operated on, in such a manner that the tool cannot be operated unless the work is properly positioned on the work support.

A further object of the invention is to provide fluid pressure operated means for controlling the operation of the tool.

A further object of the invention is to provide a fluid pressure operated device for this purpose which will be simple in its construction and operation and can be easily applied to machines of various kinds.

A further object of the invention is to provide a boring machine embodying the automatic tool control which, after the motor has been started, will be wholly automatic in its operation.

Other objects of the invention will appear as the device is described in detail.

In the accompanying drawings Fig. 1 is a top plan view of a machine embodying my invention; Fig. 2 is a front elevation of the work support; Fig. 3 is a longitudinal sectional view taken on the line 3—3 of Fig. 1 and showing the work in position on the work support; Fig. 4 is a side elevation of the machine; Fig. 5 is a transverse section taken on the line 5—5 of Fig. 4; Fig. 6 is a sectional detail view of the suction operated device; Fig. 7 is a sectional detail view of the valve for controlling the suction on the suction operated device; Fig. 8 is a transverse sectional view of the valve of Fig. 7; Fig. 9 is a circuit diagram; Fig. 10 is a sectional detail view of a modified form of the invention embodying a pressure operated clutch; Fig. 11 is a detail view, partly in section, of another modification in which direct pressure is employed; Fig. 12 is a front elevation of a portion of the work support showing the same equipped with a mechanical switch for controlling the clutch circuit; Fig. 13 is a sectional detail view of the mechanical switch; and Fig. 14 is a diagram of the circuit embodying the mechanical switch of Figs. 12 and 13.

In these drawings I have illustrated one embodiment of my invention, together with certain modifications thereof, and have shown the same as applied to a boring machine of the type shown and described in the above mentioned application but it will be understood that the invention may take various forms and may be applied to machines of various kinds.

The particular machine here illustrated comprises a base 10 having mounted thereon a cylindrical housing 11, the base and housing constituting a frame on which the various parts of the mechanism are supported. The housing 11 has a longitudinal guideway 12 in which is mounted a tool support which comprises a reciprocatory carriage 13 and a shaft 14 journaled in said carriage and held against axial movement. The shaft is provided at its forward end with suitable means, such as a chuck 15, for connecting therewith a tool 16. The tool support may be operated in any suitable manner but preferably it is driven by an electric motor, as shown at 17, this motor serving both to impart rotatory movement to the shaft and to impart forward or operative movement to the tool support as a whole. As here shown, the shaft 14 is directly connected with the motor shaft, the latter being provided with a tubular connecting device 18 in which an extension 19 of the shaft 14 is slidably mounted and in which it is held against rotation. The operative or forward movement is imparted to the tool by means of a toothed rack 20 rigidly secured to the carriage 13 and meshing with a pinion 21 rigidly secured to a transverse shaft 22 journaled in the housing 11. This shaft projects beyond one side of the housing and has mounted thereon a worm wheel 23 which meshes with a worm 24 on a shaft 25 extending lengthwise of the machine and connected by reducing gearing 26 with a belt pulley 27. This belt pulley is connected by a belt 28 with a pulley 29 which, in the present instance, is on the connecting device 18 which is attached to the motor shaft. The operative or forward movement of the tool may be controlled in any suitable manner but preferably an automatically operated clutch is interposed between the motor and the tool support. When the clutch is operative, or set, the motor will drive the tool support forwardly and when the clutch is rendered inoperative the tool support is released for rearward movement. In the present construction, the worm wheel 23 is rotatably mounted on the shaft 22 and an electro-magnetic clutch 30 is mounted on the shaft for connecting the worm wheel therewith. When the clutch is released the tool support is returned to its initial position by a spring 31 which is connected at one end with the carriage 13, extends about a guide pulley 32 and is connected at its other end with the forward portion of the housing 11, as shown at 33.

The machine is provided with a suitable work support and, in the present machine, the forward portion of the housing 11 is enlarged, as shown at 11a, to provide this work support. The machine here illustrated was designed primarily for boring or enlarging the shaft opening in the head or end frame of a motor casing, as shown at 34, and the work support is provided with an annular shoulder 35 to receive the open end of the head and accurately position the same on the work support. When the work support is designed for use with heads or other articles of different sizes a plurality of shoulders 35 may be provided and, in the present construction, a second shoulder 36 of larger diameter is arranged concentrically with the shoulder 35. The work piece is preferably retained on the work support by means of an electro-magnetic chuck, which in the present instance consists of four magnets spaced about the work support, as shown at 37. It will be noted that the pole faces of the magnet overlap both shoulders, 35 and 36, so as to operate on a work piece in engagement with either shoulder.

For the purpose of removing chips or cuttings from the bore in the work, and for cooling the tool, I have provided the machine with a suction operated chip remover. As here shown, the base 10 is hollow and has within the same a suction chamber 38 which is provided at its rear end with an opening 39 leading to a centrifugal vacuum pump of the fan type mounted in the casing 40 and driven by a motor, a portion of which is shown at 41 in Fig. 3. At the forward end of this suction chamber the base is provided with a tubular guide 42 in which is slidably mounted a suction tube 43 which is substantially L-shaped and has its outer end arranged to be moved into and out of line with the tool 16 and this end of the tube is provided with a yieldable contact member 44 to engage the outer surface of the work about the opening therein and form a tight connection between the tube and the work so that the suction created in the chamber 38 by the suction fan will draw air from the opening in the work and about the tool, thus cooling the tool and carrying the chips or cuttings into the chamber 38 where they contact with a baffle 45 and are deflected to the bottom of the chamber.

The circuits for the several electrically operated devices are shown in Fig. 9 and it will be noted there that the motors 17 and 41 are controlled by the same switch, 46, that the magnets of the chuck 37 are controlled by a switch 47, and that the electrically operated clutch 30 is controlled by a switch 48. The motor switch 46 and the chuck switch 47 are manually operated to initiate the operation of the machine and, as here shown, these switches are in the nature of mercury tube switches and are carried by brackets 48a and 49 pivotally mounted on a stud 50 projecting laterally from the housing 11. The brackets are separately movable and are provided respectively with actuating levers 51 and 52. These levers extend below the stud 50 and the lever 52 is provided with a laterally extending pin 53 arranged to be engaged by the lower end 54 of the lever 51. With this arrangement the operation of the lever 51 to close the motor switch 46 will also actuate the lever 51 and chuck switch 47 but if the operator so desires he can operate the chuck switch 47 in advance of the motor switch, but in any event the chuck switch must be closed when the motor switch is closed. In the present construction, the vacuum pump is operated by a separate motor but is controlled by the same switch that controls the motor which drives the tool. It will be obvious, however, that separate switches might be employed for controlling these motors or that the vacuum pump might be driven by the motor which drives the tool.

If the work piece is not accurately positioned on the work support when forward or operative movement is imparted to the tool the work will be improperly bored and there will also be danger of injuring the tool. I have therefore provided means for preventing the operation of the tool until the work is accurately positioned on the work support. In the present instance, this means comprises a fluid pressure operated device the operation of which is controlled by the work on the work support. Any suitable means may be employed for controlling the operative movement of the tool, such as a clutch interposed between the motor and the tool support, as above described, and this tool controlled means or clutch may be directly actuated by the fluid pressure operated device or it may be controlled by an intermediate device which, in turn, is controlled by the fluid pressure operated device. The pressure on the fluid pressure operated device is so controlled by the work that operative pressure cannot be exerted thereon unless the work is accurately positioned on the work support, and preferably the work support is provided with one or more openings which are connected with the fluid pressure operated device and are so arranged that they will be covered and substantially closed by the work when the latter is properly positioned on the work support. The pressure operating device may be actuated by connecting the same with a pressure line or with a suction creating apparatus which will reduce the pressure on one side thereof and cause the device to be actuated by atmospheric pressure. In applying the invention to that form of apparatus above described and shown in Figs. 1 to 8 I have employed a suction operated device which will now be described.

The operation of the motor 17 will immediately start the tool in rotation but if there is no work on the work support or if the work is improperly positioned thereon the operative movement of the tool will be prevented, thus preventing the improper boring of the work or injury to the tool in the event work is improperly placed on the work support. For this purpose the switch which controls the operation of the magnetic clutch 30 is controlled by a suction operated device, the suction in which is controlled by the work on the work support. In the present arrangement the clutch switch 48 is a mercury tube switch and is carried by a pivoted bracket 55 which is so arranged that when unrestrained the bracket will hold the switch in its open position, thus releasing the clutch. If desired, the bracket may be weighted, as shown at 56, to facilitate its movement to the open position of the switch. The suction operated device may take various forms but, in the present instance, comprises a casing 57 mounted on the housing 11 and having within the same a vacuum chamber 58. Mounted within the casing and intersecting the chamber is a diaphragm 59 which is connected with the switch bracket 55. In the present device this connection is effected by a coiled spring 60 which is connected at one end with the diaphragm, extends through an opening 61 in the casing 57 and is connected at its other end with the bracket 55. The opening 61 also serves to subject the lower side of the diaphragm to atmospheric pressure. The vacuum chamber 58 is connected on that side of the diaphragm opposite the connection 60 with a suitable source of suction and, as here shown, a flexible tube 62 is connected with the vacuum chamber and with the suction chamber 38, so that the creation of suction in the chamber 38 will also tend to create suction in the vacuum chamber 58 and thus cause the diaphragm to be actuated by atmospheric pressure to close the clutch switch. The creation of the suction in the vacuum chamber 58 is, however, controlled by the work on the work support, and for this purpose the work support is provided with one or more openings or ports 63 which open through the face thereof and are so arranged with relation to the work supporting surface or shoulder 35 that when the work is properly positioned on the work support the openings will be closed. As here shown, there are two openings arranged on opposite sides of the work support and the work must be positioned on the work support with absolute accuracy in order that both openings may be closed. These openings are connected by branch tubes 64 with a main tube 65 which is so connected with the vacuum chamber 58 as to control the suction therein, and is here shown as connected with the tube 62. The arrangement of the tubes 62 and 65 is such that when one of the ports 63 in the work support is open the suction in the tube 62 and vacuum chamber 58 will be relieved and the diaphragm will not be operated. As soon as the ports 63 have been closed by the work the suction in the chamber 38 will be exerted on the diaphragm and the clutch switch moved to its closed position, thereby establishing the operative connection between the carriage and the motor. When, as in the present instance, the work support has a plurality of surfaces or shoulders for supporting the work thereon it is provided with a corresponding number of series of openings, as shown at 66, the additional openings being connected by branch tubes 67 with a main tube 68 which is also connected with the tube 62. Means are provided for interrupting the connection between one of the tubes 65 or 68, and the tube 62, according to the size of the work which is being operated upon, as will be hereinafter described.

In practice the work is often of such a character that while it will substantially close the air ports in the work support, when properly positioned thereon, it will not establish an absolutely air tight closure. For example, it is not necessary to the function of the end frame 34 that all parts of the surface thereof, which engages the work support, shall be in exactly the same plane and when such an end frame is accurately positioned on the work support there may be a slight clearance between the same and those portions of the work support which surround the ports, but this clearance would be only a few thousandths of an inch and would not materially affect the control of the pressure operated device. It will therefore be understood that reference herein to the closure of the ports by the work is not limited to an absolute closure but is intended to include a substantial closure sufficient for the intended purpose. It is desirable, however, that means be provided for regulating the connection between the ports and the suction operated device to compensate for leakage about different kinds of work and for like purposes, and this is preferably accomplished by interposing a valve between the tubes which lead from the suction operated device and from the ports.

In the present construction the tubes 62, 65 and 68 are connected with a valve which comprises a casing 69 with which the several tubes are connected. The tubes 65 and 68 are connected with the valve casing through separate ports 70 and 71 and the connection is controlled by a rotary valve member 72 having a radial port 73 adapted to be moved into line with either port, 70 or 71, and to connect that port with a passageway 74 which communicates with the suction chamber 38. In the present arrangement this passageway is in the nature of a longitudinal bore in the rotary valve member 72 and extends through the open end of the valve member in line with an opening 75 in the top wall of the suction chamber 38. The rotary valve member 72 has a second radial port 76 which connects the passageway 74 with the tube 62 of the vacuum chamber 58, the valve member being provided with an annular groove 77 so that the tube 62 will be connected with the passageway in all positions of the valve member. The passageway 74 is provided with a valve seat 78 with which cooperates a needle valve 79 to regulate the size of the passageway and therefore the amount of suction exerted on the diaphragm 59. As here shown, the valve member 72 has a handle 80 by means of which it may be rotated and the needle valve is screw threaded into the end of the valve member 72 and is held in adjusted positions by a nut 81.

It will be apparent therefore that when the valve 72 has been set to connect the desired set of ports, 63 or 66, with the suction apparatus the work is placed in position on the work support and the motor switch 46 is closed, thus starting both motors, creating a suction in the suction chamber 38 and imparting rotatory movement to the tool shaft 14. If the work is properly positioned upon the work support and the openings therein substantially closed sufficient suction will be exerted in the vacuum chamber 58 to raise the diaphragm 59 and close the clutch switch, thus causing the motor to impart a forward or operative movement to the tool. As has been explained, the chuck switch was closed at the same time that the motor switch was closed and therefore the work is tightly held on the work support. At the end of the boring operation the motor switch and the chuck switch 47 are automatically opened. This is preferably accomplished by securing to the shaft 22 a trip finger 83 arranged to engage the lower end of the lever 52 for the chuck switch, thus actuating both the motor switch and the chuck switch. The opening of the motor switch stops both motors and thus interrupts both the operation of the tool and the suction in the suction chamber 38. The interruption of the suction releases the diaphragm 59 and permits the clutch switch to open thereby disconnecting the carriage 13 from the motor and permitting the same to be moved rearwardly by the spring 31. If desired, a brake may be applied to the tool motor in any of the usual ways, after the motor switch has been opened, to insure the stopping of the rotation of the tool before the clutch is released and the tool carriage retracted.

If the chucks were deenergized upon the opening of the chuck switch there would be danger of injury to the tool upon the removal of the work, especially in case the tool should stick or for any reason should not promptly return to its retracted position. I have therefore connected a second switch 84 in the chuck circuit in parallel with the switch 47 and have provided means for opening this second switch when the carriage is returned to its initial position. In the present arrangement this second chuck switch, or safety switch, 84 is carried by a lever 85 so arranged that the switch will be held normally in its closed position by gravity and having an upturned end or trip finger 85a arranged beneath the shaft 22 in a position to be engaged by a pin 83a on the finger 82 on the shaft as the carriage approaches its initial position, thus tilting the lever and opening the switch 84. The switch 84 will be held in its open position until initial forward movement is again imparted to the carriage and will then automatically close.

In Fig. 10 of the drawings I have illustrated an arrangement of the apparatus wherein the tool controlling means or clutch is directly operated by fluid pressure. In that figure the worm wheel on the shaft 22 is shown at 90 but instead of connecting this worm wheel with the shaft by a magnetic clutch I have made the worm wheel a part of a pressure operated clutch. The worm wheel has at its outer side a friction surface 91 and the shaft 22 on which the worm wheel is mounted has rigidly secured thereto a head or plate 92 of considerable diameter which is opposed to the friction surface 91. Preferably a disk of friction material 93 is interposed between the head 92 and the worm wheel. The worm wheel is also provided with outwardly extending studs 94, on the outer ends of which is rigidly mounted a friction member or plate 95, this plate being spaced a substantial distance from the head 92 on the shaft. A disk or plate of friction material 96 is arranged on the inner side of the plate 95 and is adapted to be moved into and out of engagement with that plate. Interposed between the head 92 and the friction plate 96 is a bellows 97 of the sylphon type with which is connected a tube 98 which extends through the friction member 96 and the end plate 95, and this tube is connected by a conduit 99 with a suitable source of air pressure. When there is no pressure within the sylphon 97 the latter will contract and the worm wheel and plate 95 may revolve freely with relation to the shaft but when air under pressure is introduced into the sylphon the latter will expand and will press friction member 96 firmly into engagement with the plate 95 and will also draw the worm wheel into firm engagement with the head 92, thereby establishing between the shaft and the worm wheel a frictional connection sufficient to properly drive the shaft. The sylphon may be connected with a pressure line in any suitable manner and, as here shown, the conduit 99 leads to a valve casing 100, which is provided with an axial bore or port 101 adapted to be connected with any suitable source of supply of air under pressure. This valve casing is also connected by a conduit 102 with an air port or ports 103 in the work support 11a so that the pressure in the sylphon will be controlled by the work on the work support in the manner above described, with this difference: in the present arrangement air under pressure will escape through the port 103 while in the former arrangement air was drawn through that port by suction. To regulate the action of the pressure on the sylphon the port 101 of the valve casing has at its inner end a valve seat with which cooperates a needle valve 104.

Only a very slight change is necessary in the mechanism shown in Figs. 1 to 9 to convert the controlling device there shown from a suction operated device into a direct pressure operated device. This change consists in converting the pressure operated device from suction operation to direct pressure operation. The direct pressure operated device, as shown in Fig. 11, comprises a casing 105 having a chamber which is provided with a diaphragm 106, similar to the casing 57 and diaphragm 59, but in this instance the diaphragm is held normally in its elevated position by a spring 107. The diaphragm is connected with a supporting bracket 108 for the clutch switch 109 in the same manner as above described but this bracket is so arranged that when the diaphragm is in its elevated position the switch will be in its open position. The conduit 110, which is connected with the casing 105 above the diaphragm, is adapted to be connected with a source of supply of air under pressure and when this pressure is admitted to the casing the diaphragm will be forced downwardly and the switch moved to its closed position. The control of pressure on the diaphragm may be effected in the same manner as the suction is controlled on the suction operated device and as the pressure in the sylphon is controlled, as shown in Fig. 10.

In some cases it may be desirable that the work controlled device for controlling the clutch shall be in the nature of a mechanical switch, such as is shown and described in the above mentioned application, and when such a switch is employed I prefer to utilize a fluid pressure operated switch in series therewith to prevent the burning of the contacts. Such an arrangement is shown in Figs. 12 to 14 and the work controlled clutch switch comprises two fixed contacts 111 which, in the present instance, are mounted in a cavity in the rear side of the work support 11a. Cooperating with these fixed contacts is a movable contact member 112 which is actuated by a plunger 113 which is acted upon by a spring 114 to project the forward end thereof slightly beyond the surface of the work support. The projecting end of this plunger is so arranged that it will be engaged by the work when the latter is properly positioned upon the work support and the plunger forced inwardly by the work, either when the latter is placed in position or when the magnetic chuck is energized, thereby moving the contact member 112 into engagement with the fixed contacts. Connected in the clutch circuit and in series with the switch 111—112 is a fluid pressure operated switch 115 which may be of the type shown in Figs. 1 to 9. However, in this instance the fluid pressure operated device is not connected with the work support and the pressure thereon is controlled solely by the vacuum pump which acts upon the suction chamber 38. When the motor switch is closed, to start the motors 17 and 41 into operation the magnetic chuck is also energized and if the mechanical switch 111—112 has not already been closed it will then be closed, but at this instant there is no suction in the suction chamber 38 and consequently the switch 115 will be open. As the suction fan gains speed suction will be created in the suction chamber and this suction will act upon the pressure operated device to close the switch 115. However, it will require a brief interval, a few seconds, to create sufficient suction to close the switch 115 and the closing of that switch is therefore so retarded that the clutch circuit will not be closed by the closing of the switch 111—112, when the chuck is energized, and consequently there will be no sparking at the contacts. Likewise when the motor switch is opened the interruption of the suction due to the stopping of the suction fan will open the switch 115 so that the clutch circuit is dead at the time the work is removed and the mechanical switch opened.

While I have shown and described one embodiment of my invention, together with certain modifications thereof, I wish it to be understood that I do not desire to be limited to the details thereof as various modifications may occur to a person skilled in the art.

Having now fully described my invention, what I claim as new and desire to secure by Letters Patent, is:

1. In a machine of the character described, a tool, electrically operated means to control the operation of said tool, a switch in circuit with said electrically operated means, a switch actuating device comprising a vacuum chamber and a flexible diaphragm therein, means for connecting said diaphragm with said switch, a work support having a port arranged to be closed by the work when the latter is properly positioned on said work support, conduits leading from said vacuum chamber and said port and merging into a single passageway, and a suction creating device connected with said passageway.

2. In a machine of the character described, a tool, electrically operated means to control the operation of said tool, a switch in a circuit with said electrically operated means, a switch actuating device comprising a vacuum chamber and a flexible diaphragm therein, means for connecting said diaphragm with said switch, a work support having a port arranged to be closed by the work when the latter is properly positioned on said work support, conduits leading from said vacuum chamber and said port and merging into a single passageway, a suction creating device connected with said passageway, and means for regulating the passage of air through said passageway.

3. In machine of the character described, a tool, electrically operated means to control the operation of said tool, a switch in circuit with said electrically operated means, a switch actuating device comprising a vacuum chamber and a flexible diaphragm therein, means for connecting said diaphragm with said switch, a work support having a port arranged to be closed by the work when the latter is properly positioned on said work support, a valve having a passageway to be connected with a source of suction and an adjustable member to regulate the passage of air through said passageway, and conduits leading from said vacuum chamber and said port to said valve.

4. In a machine of the character described, a tool, electrically operated means to control the operation of said tool, a switch in circuit with said electrically operated means, a switch actuating device comprising a vacuum chamber and a flexible diaphragm therein, means for connecting said diaphragm with said switch, a work support having a plurality of surfaces adapted to support work pieces of different sizes and each having a port arranged to be closed by the work when the latter is properly positioned thereon, a valve having a passageway to be connected with a source of suction and comprising a casing, and a member movably mounted in said casing, conduits connecting said ports with said casing, said movable member having a port to selectively connect said conduits with said passageway, and a conduit leading from said vacuum chamber to said valve casing and connected with said passageway.

5. In a machine of the character described, a tool, electrically controlled means to control the operation of said tool, a switch in circuit with said electrically controlled means, a pressure operated device to control the position of said switch, a work support having an opening arranged to be closed by the work thereon when said work is properly positioned with relation to said work support, means for so connecting said opening with said pressure operated device that operative pressure will be exerted on said pressure operated device only when said opening is closed, and means for interrupting the pressure on said pressure operated device while said opening is closed.

6. In a machine of the character described, a tool, a suction chamber, motor driven means for actuating said tool and for creating suction in said suction chamber, a switch to control said motor driven means, an electrically controlled clutch to control the operation of said tool, a switch to control the operation of said clutch, a suction operated device communicating with said suction chamber and operatively connected with said clutch switch, a work support having an opening arranged to be closed by the work when the latter is properly positioned on said work support, and means for so connecting said opening with said suction chamber that said suction operated device will be controlled by the work on said work support.

7. In a machine of the character described, a tool, a suction chamber, motor driven means for actuating said tool and for creating suction in said suction chamber, a switch to control said motor driven member, an electrically controlled clutch to control the operation of said tool, a switch to control the operation of said clutch, a suction operated device to close said clutch switch, means for connecting said device with said suction chamber, a work support having a series of work controlled openings so arranged that the work must be properly positioned on said support in order to close all of said openings, and means for connecting said openings with the connecting means between said suction operated device and said suction chamber, whereby said clutch switch will be closed only when the work is properly positioned on said work support.

8. In a machine of the character described, a movable tool support, a tool rotatably mounted on said tool support, driving mechanism for rotating said tool and imparting forward movement to said tool support, a fluid pressure operated device to control the the connection between said tool support and said driving mechanism, a work support having means controlled by the work thereon to so control said fluid pressure operated device that the connection between said tool support and said driving mechanism will be established only when the work is properly positioned on said work support, means controlled by the movement of said tool support to interrupt the operation of said driving mechanism when said tool support has been advanced a predetermined distance and to relieve the pressure on said pressure operated device and thus cause said tool support to be disconnected from said driving mechanism, and means for imparting reverse movement to said tool support after it has been so disconnected.

9. In a machine of the character described, a movable tool support, a tool rotatably mounted on said tool support, driving mechanism for rotating said tool and imparting forward movement to said tool support, a fluid pressure operated device to control the connection between said tool support and said driving mechanism, a work support having means controlled by the work thereon to so control said fluid pressure operated device that the connection between said tool support and said driving mechanism will be established only when the work is properly positioned on said work support, means controlled by the movement of said tool support to first interrupt the operation of said driving mechanism when said tool support has been advanced a predetermined distance and to relieve the pressure on said pressure operated device after the rotation of said tool has ceased and thus cause said tool support to be disconnected from said driving mechanism, and means for imparting reverse movement to said tool support after it has been so disconnected.

10. In a machine of the character described, a movable tool support, a suction chamber, motor driven means for imparting forward movement to said tool support and for creating suction in said suction chamber, a motor switch, an electrically controlled clutch to control the movement of said tool support, a clutch switch, a suction operated device to close said clutch switch, means for connecting said device with said suction chamber, a work support having an opening arranged to be closed by the work when the latter is properly positioned on said work support, said opening being connected with said suction chamber to control the suction in said suction operated device, and means controlled by the movement of said tool support to open said motor switch and interrupt the movement of said tool support and the creation of suction in said suction chamber, thereby causing said clutch switch to be opened after said motor switch has been opened.

11. In a machine of the character described, a movable tool support, a suction chamber, motor driven means for imparting forward movement to said tool support and for creating suction in said suction chamber, a motor switch, an electrically controlled clutch to control the movement of said tool support, a clutch switch, a suction operated device to close said clutch switch, means for connecting said device with said suction chamber, a work support having an opening arranged to be closed by the work when the latter is properly positioned on said work support, said opening being connected with said suction chamber to control the suction in said suction operated device, means controlled by the movement of said tool support to open said motor switch and interrupt the movement of said tool support and the creation of suction in said suction chamber, thereby causing said clutch switch to be opened after said motor switch has been opened, and means acting on said tool support to automatically move the same in a reverse direction.

12. In a machine of the character described, a supporting structure having a suction chamber, an air exhausting device connected with said suction chamber, a motor for driving said device, a reciprocatory tool support, a tool rotatably mounted in said tool support, a motor for imparting forward movement to said tool support and for rotating said tool, a switch to control both motors, an electrically controlled clutch to control the connection between the last mentioned motor and said tool support, yieldable means to impart reverse movement to said tool support when said clutch is released, a switch to control said clutch, a suction operated device to actuate said clutch switch, means for connecting said suction operated device with said suction chamber, a work support having an opening arranged to be closed by the work when the latter is properly positioned on said work support, means for connecting said opening with said suction chamber to control the suction on said suction operated device, and means controlled by the movement of said tool support to open said motor switch when said tool support has been advanced a predetermined distance and thereby interrupt the movement of said tool and relieve the suction on said suction operated device.

13. In a machine of the character described, a supporting structure having a suction chamber, an air exhausting device connected with said suction chamber, a motor for driving said device, a reciprocatory tool support, a motor for imparting forward movement to said tool support, a switch to control both motors, an electrically controlled clutch to control the connection between the last mentioned motor and said tool support, yieldable means to impart reverse movement to said tool support when said clutch is released, a switch to control said clutch, a suction operated device to actuate said clutch switch, means for connecting said suction operated device with said suction chamber, a work support having means controlled by the work when the latter is properly positioned on said work support to control the suction on said suction operated device, and means controlled by the movement of said tool support to open said motor switch when said tool support has completed its forward movement.

14. In a machine of the character described, a tool, a suction chamber, motor driven means for actuating said tool and for creating suction in said suction chamber, a switch to control said motor driven means, an electrically controlled clutch to control the operation of said tool, a switch to control the operation of said clutch, a switch actuating device comprising a vacuum chamber and a diaphragm therein, means for connecting said diaphragm with said clutch switch, means for connecting said vacuum chamber with said suction chamber, a work support having an opening arranged to be closed by the work when the latter is properly positioned on said work support, and means for so connecting said opening with said suction chamber that the suction in said vacuum chamber will be controlled by the work on said work support.

15. In a machine of the character described, a tool, a driving mechanism for said tool, means for starting and stopping said driving mechanism, electrically operated means for controlling the operation of said tool by said driving mechanism, a switch in circuit with said electrically operated means, a work support, an actuating device for said switch arranged to be engaged by the work when the latter is properly positioned on said work support and to be moved thereby in a direction to close said switch, a second switch in series with the first mentioned switch, and actuating means for said second switch controlled by said starting and stopping means to cause said second switch to be closed after the first mentioned switch is closed and to be opened before the first mentioned switch is opened.

16. In a machine of the character described, a tool, driving mechanism for said tool, means for starting and stopping said driving mechanism, electrically operated means for controlling the operation of said tool by said driving mechanism, a mechanical switch in circuit with said electrically operated means, a work support, an actuating device for said switch arranged to be engaged by the work when the latter is properly positioned on said work support and to be moved thereby in a direction to close said switch, a mercury tube switch in series with said mechanical switch, a fluid pressure operated device to actuate said mercury tube switch, and means controlled by said starting and stopping means to cause said pressure operated device to close said mercury tube switch after said mechanical switch is closed and to open the same before said mechanical switch is opened.

17. In a machine of the character described, a tool, a motor to drive said tool, electrically operated means to control the operation of said tool by said motor, a switch in circuit with said electrically operated means, a work support, an actuating device for said switch arranged to be engaged by the work when the latter is properly positioned on said work support and moved thereby in a direction to close said switch, an electrically operated chuck to secure the work on said work support, a second switch in series with the first mentioned switch, a suction operated device to actuate said second switch, a suction creating apparatus connected with said suction operated device, a motor to drive said suction creating device, and switch means for simultaneously closing the circuits through said motors and said chuck.

18. In a machine of the character described, a tool, feeding mechanism for said tool including means for starting the feeding operation, a fluid pressure operated device to control the operation of said starting means, and a stationary work support having means controlled by the work thereon to prevent the operation of said pressure operated device until a work piece is properly positioned on said work support.

19. In a machine of the character described, a tool, feeding mechanism for said tool including means for starting the feeding operation, a fluid pressure operated device to control the operation of said starting means, and a work support having an area adapted to be covered by the work and an opening arranged within said area to be closed by the work when the latter is properly positioned thereon, and means for connecting said opening with said fluid pressure operated device to control the operation of said device.

20. In a machine of the character described, a tool, feeding mechanism for said tool including means for starting the feeding operation, a fluid pressure operated device to control the operation of said starting means, a work support having an area adapted to be covered by the work and an opening arranged within said area to be closed by the work when the latter is properly positioned thereon, and means for so connecting said opening with said pressure operated device that operative pressure will be exerted on said device only when said opening is substantially closed.

21. In a machine of the character described, a tool, feeding mechanism for said tool including means for starting the feeding operation, a fluid pressure operated device to control the operation of said starting means, a work support having an area adapted to be covered by the work and a plurality of openings so arranged within said area that all of said openings will be substantially closed by the work when the latter is properly positioned on said work support, and means for so connecting said openings with said pressure operated device that pressure will be exerted on said device only when all of said openings are substantially closed.

22. In a machine of the character described, a tool, feeding mechanism for said tool including a clutch, means comprising a fluid operated device to control the operation of said clutch, and a stationary work support having means controlled by the work thereon to prevent the operation of said pressure operated device until a work piece is properly positioned on said work support.

23. In a machine of the character described, a tool, feeding mechanism for said tool including a clutch, means for actuating said clutch comprising a fluid pressure operated device, a work support having an area adapted to be covered by the work and an opening within said area to be closed by the work when the latter is properly positioned thereon, and a conduit connecting said opening with said fluid pressure operated device to control the pressure on said device.

24. In a machine of the character described, a tool, feeding mechanism for said tool including means for starting the feeding operation, a suction operated device to control the operation of said starting means, and a stationary work support having means controlled by the work thereon to prevent the operation of said suction operated device until a work piece is properly positioned on said work support.

25. In a machine of the character described, a tool, feeding mechanism for said tool including a clutch, means for actuating said clutch comprising a suction operated device, and a work support having an area adapted to be covered by the work and in opening within said area to be closed by the work when the latter is properly positioned thereon to control the suction on said suction operated device.

26. In a machine of the character described, a tool, feeding mechanism for said tool including means for starting the feeding operation, a fluid pressure operated device to actuate said starting means, and a stationary work support having means controlled by the work thereon to prevent the operation of said pressure operated device until the work piece is properly positioned on said work support.

27. In a machine of the character described, a tool, feeding mechanism for said tool including a clutch, a fluid pressure operated device to actuate said clutch, and a stationary work support having means controlled by the work thereon to prevent the operation of said fluid pressure operated device until a work piece is properly positioned on said work support.

28. In a machine of the character described, a tool, electrically controlled feeding means for said tool, a switch in circuit with said electrically controlled means, a fluid operated device to control the position of said switch, and a stationary work support having means controlled by the work thereon to prevent the operation of said pressure operated device until a work piece is properly positioned on said work support.

29. In a machine of the character described, a tool, feeding mechanism for said tool including an electrically operated clutch, a switch to control the operation of said clutch, a fluid pressure operated device for actuating said switch, a work support having an area adapted to be covered by the work and an opening within said area to be closed by the work when the latter is properly positioned on said support, and a conduit connecting said opening with said pressure operated device.

30. In a machine of the character described, a tool, electrically controlled feeding means for said tool, a switch in circuit with said electrically controlled means, a fluid pressure operated device to control the position of said switch, a work support having an area adapted to be covered by the work and a plurality of ports so arranged within said area that all of said ports will be closed by the work when the latter is properly positioned thereon, and means for so connecting said ports with said pressure operated device that pressure may be exerted on said device only when all of said ports are closed.

31. In a machine of the character described, a tool, electrically controlled feeding means for said tool, a switch in circuit with said electrically controlled means, a suction operated device to control the position of said switch, and a stationary work support having means controlled by the work thereon to prevent the operation of said suction operated device until a work piece is properly positioned on said work support.

32. In a machine of the character described, a tool, feeding mechanism for said tool including an electrically operated clutch, a switch to control the operation of said clutch, a suction operated device for actuating said switch, and a stationary support for the work on which said tool is to operate, said work support having means controlled by the work thereon to prevent the operation of said suction operated device until a work piece is properly positioned on said work support.

33. In a machine of the character described, a tool, electrically controlled feeding means for said tool, a switch in circuit with said electrically controlled means, a suction operated device to control the position of said switch, a work support having an area adapted to be covered by the work and an opening within said area to be closed by the work thereon when said work is properly positioned with relation to said work support, and means for so connecting said opening and said suction operated device with a source of suction that suction will be created in said suction operated device only when said opening is closed.

34. In a machine of the character described, a tool, electrically controlled feeding means for said tool, a switch in circuit with said electrically controlled means, a suction operated device to control the position of said switch, a passageway connecting said suction operated device with a source of suction, a work support having an area adapted to be covered by the work and a plurality of ports so arranged within said area that all of said ports will be closed by the work when the latter is properly positioned on said work support, and means for connecting each of said ports with said passageway.

35. In a machine of the character described, a tool, means for operating said tool, a fluid pressure chamber, a diaphragm within said chamber, means controlled by said diaphragm for controlling the operation of said feeding means, means for connecting said pressure chamber with a source of fluid pressure, a work support having an area adapted to be covered by the work and an opening within said area to be closed by the work when the latter is properly positioned thereon, and means for connecting said opening with said pressure chamber to control the pressure therein.

GEORGE H. LELAND.